US007783412B2

(12) United States Patent
Poignant et al.

(10) Patent No.: US 7,783,412 B2
(45) Date of Patent: Aug. 24, 2010

(54) METHOD OF DETERMINING THE INJECTION TIMING IN A FOUR-STROKE HEAT ENGINE AND DEVICE FOR IMPLEMENTING THIS METHOD

(75) Inventors: Damien Poignant, Cergy le Haut (FR); Pierrick Plouzennec, Toulouse (FR)

(73) Assignee: Valeo Systemes de Controle Moteur, Cergy Pontoise Cedex (FR)

( * ) Notice: Subject to any disclaimer, the term of this patent is extended or adjusted under 35 U.S.C. 154(b) by 27 days.

(21) Appl. No.: 11/996,250

(22) PCT Filed: Jul. 18, 2006

(86) PCT No.: PCT/FR2006/001750

§ 371 (c)(1), (2), (4) Date: Jul. 22, 2008

(87) PCT Pub. No.: WO2007/010129

PCT Pub. Date: Jan. 25, 2007

(65) Prior Publication Data

US 2008/0295802 A1 Dec. 4, 2008

(30) Foreign Application Priority Data

Jul. 22, 2005 (FR) .................................. 05 07817

(51) Int. Cl.
*B60T 7/12* (2006.01)
*F02B 17/00* (2006.01)

(52) U.S. Cl. ........................ 701/105; 123/294; 123/305

(58) Field of Classification Search ................. 701/101, 701/103, 104, 105; 123/294, 305, 406.11, 123/406.26, 406.47, 491
See application file for complete search history.

(56) References Cited

U.S. PATENT DOCUMENTS

| | | | | |
|---|---|---|---|---|
| 5,947,095 | A * | 9/1999 | Kato | 123/673 |
| 5,979,413 | A | 11/1999 | Ohnuma et al. | |
| 6,029,641 | A * | 2/2000 | Suzuki et al. | 123/673 |
| 6,694,956 | B2 * | 2/2004 | Kawaguchi et al. | 123/568.21 |
| 6,722,342 | B2 * | 4/2004 | Ogawa et al. | 123/305 |

(Continued)

FOREIGN PATENT DOCUMENTS

EP 0 684 375 11/1995

OTHER PUBLICATIONS

International Search Report (French & English) for PCT/FR2006/001750 mailed Jan. 12, 2006 (4 pages).

*Primary Examiner*—John T Kwon
(74) *Attorney, Agent, or Firm*—Osha • Liang LLP

(57) ABSTRACT

The invention concerns a method for determining the timing of an injection cycle relative to an operating cycle of a four-stroke engine (ECH, ADM, COMP, DET), the timing being possibly correct or wrong, the method including the step of operating the engine while modifying a first operating parameter of the engine adapted to bring about on the engine operating effects which are different depending on whether the timing is correct or wrong; it consists in simultaneously modifying a second operating parameter of the engine adapted to bring about on the engine operating mode effects which compensate the effects modifying the first operating parameter of the engine when the timing is correct, and which do not compensate the efforts modifying the first operating parameter of the engine when the timing is wrong.

13 Claims, 3 Drawing Sheets

U.S. PATENT DOCUMENTS 7,267,103 B2 * 9/2007 Yasui et al. ............ 123/406.41
2002/0166540 A1 11/2002 Boerkel
2003/0070653 A1 * 4/2003 Ogawa et al. ............... 123/305
2006/0112933 A1 * 6/2006 Yasui et al. ............ 123/406.41

* cited by examiner

METHOD OF DETERMINING THE INJECTION TIMING IN A FOUR-STROKE HEAT ENGINE AND DEVICE FOR IMPLEMENTING THIS METHOD

The invention relates to a method for determining the timing of the injection cycle with respect to the operating cycle of a four-stroke combustion engine and to a device for implementing it.

BACKGROUND OF THE INVENTION

The operating cycle of each of the cylinders of a four-stroke combustion engine is spread over two revolutions of the crankshaft. One and the same angular position of the crankshaft can therefore correspond to two different strokes in the operating cycle of the cylinder.

It is therefore important to identify where the cylinder concerned falls within the operating cycle in order to ensure that injection takes place at the correct moment for this cylinder, that is to say during an injection period that extends during the exhaust stroke in the case of indirect injection engines. If this is not done, injection will be performed out of synchronism with the cylinder operating cycle, that is to say with a phase-shift of half a cylinder operating cycle (namely one revolution of the crankshaft).

Because identifying the angular position of the crankshaft is not sufficient to identify the phases of the cycle of the cylinder concerned, it is known practice to use additional information that sets aside the uncertainty of one half-cycle over the injection period.

To do this, it is known practice to fit an angular position sensor on at least one of the camshafts. Because the camshaft performs one revolution per cycle, it then becomes possible to establish a one-to-one relationship between an angular position and a given instant in the operating cycle. However, these sensors are expensive and are tricky to fit.

It is a more particular object of the invention to provide a method that makes it possible to determine the phase of the cycle without using an angular position sensor on the camshaft.

To do this, it is known practice to run the engine while making a change to at least one first engine operating parameter (for example by increasing the injection period), and to determine the effect that this change has on the running of the engine, the change being able to bring about, in the running of the engine, effects that differ according to whether the timing is correct or out of synchronism.

However, changing the injection parameter generally leads to a change in the operation of the engine that can be discerned disagreeably by the occupants of the vehicle, such as jerky engine operation, for example, whether the timing is correct or out of synchronism.

SUBJECT OF THE INVENTION

The subject of the invention is a method for determining the timing of the injection cycle with respect to the operating cycle of an engine cylinder that reduces the risks of disagreeable experiences as far as the occupants of the vehicle are concerned.

BRIEF DESCRIPTION OF THE INVENTION

In order to realize this objective, the method of the invention comprises the step of, at the same as making a change to the first engine operating parameter, making a change to a second engine operating parameter designed to bring about, in the running of the engine, effects which compensate for the effects of the change to the first engine operating parameter when the timing is correct, and which do not compensate for the effects of the change to the first engine operating parameter when the timing is out of synchronism.

Thus, if the timing is correct, the driver will feel no effect due to the implementation of the method of the invention. If the timing is the out-of-synchronism timing, all that will be required will be for implementation of the method to be halted before its effects can be felt disagreeably by the driver.

The risk of the passengers of the vehicle having disagreeable experiences is thus greatly reduced.

The invention proposes to run the engine with the timing of an earlier running of the engine. This is because there is every chance that this timing will be the correct timing if the vehicle has not been moved between the last running of the engine and the time it is restarted. Thus, in most instances, the driver will feel no effect due to the implementation of the engine operating method.

BRIEF DESCRIPTION OF THE DRAWINGS

The invention will be better understood in light of the description which follows, with reference to the figures of the attached drawings, among which.

DETAILED DESCRIPTION OF THE INVENTION

Figure 1:
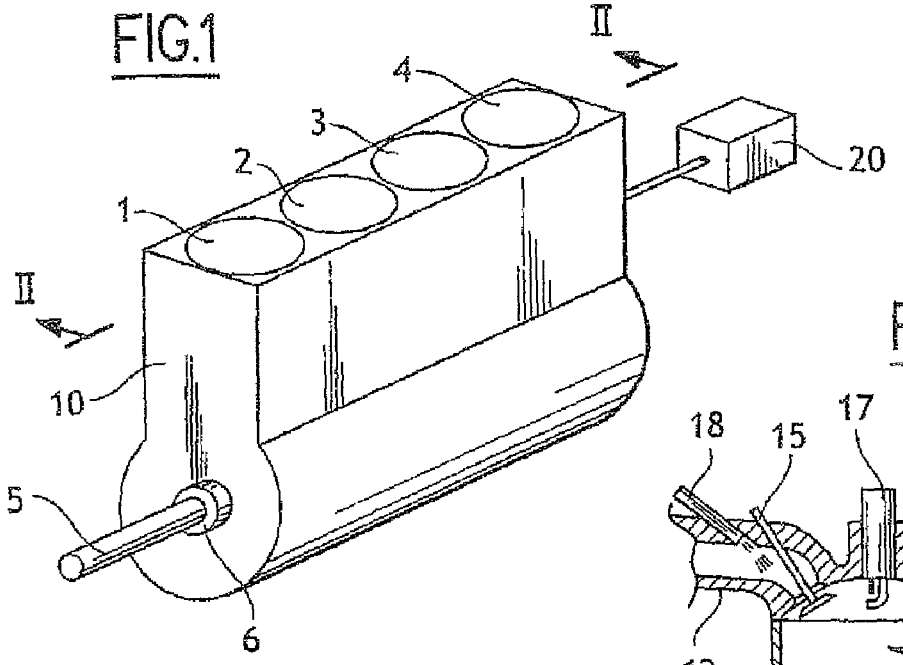
FIG. 1 is a schematic perspective diagram of an in-line four cylinder combustion engine running on a four-stroke operating cycle.

With reference to FIG. 1, implementation of the method of the invention is illustrated here in its application to an indirect injection four-stroke combustion engine. The engine illustrated comprises a cylinder block 10 delimiting four in-line cylinders 1, 2, 3, 4 and has a crankshaft 5 of which the end protruding from the engine block 10 can be seen here.

In a way known per se, the operating cycle of each of the engines comprises an induction stroke, a compression stroke, a power stroke and an exhaust stroke. Each stroke represents one quarter of an operating cycle, namely half a revolution of the crankshaft.

Figure 2:
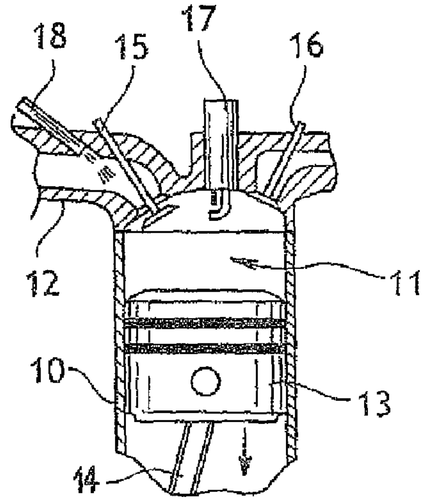
FIG. 2 is a schematic sectioned view on II-II of FIG. 1, through one of the cylinders of the engine.

With reference to FIG. 2, each cylinder defines a chamber 11 that is closed at one end by a cylinder head 12 and is closed at the other end by a piston 13 able to slide in the cylinder between two extreme positions (top dead center and bottom dead center) and connected to the crankshaft by a connecting rod 14. The cylinder head 12 bears:

- an intake valve 15 which is made to open during the induction stroke of the cylinder operating cycle, as depicted here;
- an exhaust valve 16 which is made to open during the exhaust stroke of the cylinder operating cycle;
- a spark plug 17 which is made to generate a spark during the compression cycle but also, in this particular instance, during the exhaust cycle;
- an injector 18 which is positioned in the intake upstream of the intake valve 15 and which is made to inject fuel during the exhaust stroke if the injection is correctly timed with respect to the engine operating cycle.

The engine 10 is preferably associated with a computer 20 which, amongst other things, deals with the timing of the ignition cycle and of the injection cycle with respect to the engine operating cycle.

The engine comprises an angular position sensor 6 designed to identify the movement of the crankshaft through a given angular position which, for example, corresponds to top dead center on cylinder 1. The sensor 6 generates a synchronizing signal which is forwarded to the computer 20.

Figure 3:
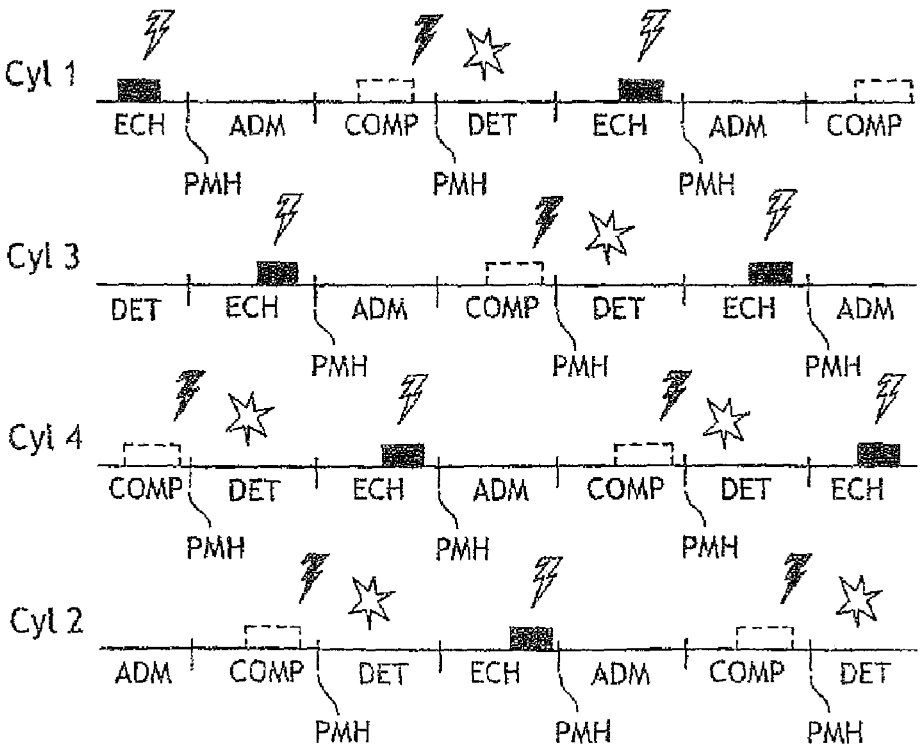
FIG. 3 is a diagram showing, as a function of time, the strokes of the operating cycles of the four cylinders of the engine of FIGS. 1 and 2 and the associated ignition and injection cycles.

With reference to FIG. 3, each of the cylinders operates on a four stroke cycle, each of the strokes representing half a revolution of the crankshaft. The strokes are referenced ADM for induction, COMP for compression, DET for power and ECH for exhaust. In a way known per se, the pistons lie at top dead center at the end of the compression and exhaust strokes and lie at bottom dead center at the end of the induction and power strokes.

Each stroke is delineated in FIG. 3 by vertical separations marking the instants when the cylinders reach an extreme position, either top dead center (PMH) or bottom dead center (PMB). As is known per se, the cylinders 1, 3, 4, 2 respectively accomplish these same strokes with a phase shift of one quarter of an operating cycle.

For each cylinder, a useful spark (depicted symbolically in FIG. 3 as a black flash) is generated during the compression stroke COMP in order initiate detonation of the fuel/oxidant mixture in the chamber 11. In this instance, an unusable spark is also produced during the exhaust stroke ECH (depicted symbolically in FIG. 3 by a white flash). Thus, the ignition cycle involves two sparks per operating cycle, the two sparks being separated by half an operating cycle, namely one revolution of the crankshaft. On each occasion, the spark is produced with a nominal ignition advance a with respect to the top dead center position PMH at which the piston will lie at the end of the compression or exhaust stroke.

Identifying top dead center PMH for cylinder 1 using the sensor 6 installed on the crankshaft therefore allows the ignition cycle to be positioned correctly with respect to the operating cycle. It will be observed that the ignition cycle for cylinder 1 and for cylinder 4 are identical, while the ignition cycle for cylinder 2 and for cylinder 3 are phase-shifted by one quarter of an operating cycle, namely by half a revolution of the crankshaft. It is therefore easy, having set the timing of the ignition cycle for cylinder 1, to set the timing of the ignition cycles for the other cylinders.

The same is not true of the injection cycle. This is because injection occurs but once per operating cycle, normally during the exhaust stroke ECH. In FIG. 3, injection is depicted symbolically by a black rectangle the length of which is proportional to a nominal injection period T.

In order to set the timing of the injection cycle, top dead center information is not enough because this information alone does not differentiate between whether the corresponding cylinder is, after it passes through top dead center, in its induction stroke ADM or its power stroke DET.

Thus, the injection cycle can be correctly timed such that injection occurs during the exhaust stroke ECH, but it can also be timed out of synchronism, as illustrated by the rectangles marked in dotted line, that is to say that injection occurs during the compression stroke COMP.

It will be noted that the injection cycles are, for cylinders 1, 3, 4, 2, respectively, phase-shifted by one quarter of an engine operating cycle, as are the operating cycles of the cylinders themselves. All that is therefore required is for the injection cycle to be timed correctly with respect to the operating cycle for cylinder 1, the timings for the other cylinders then being readily deduced by phase-shifting by the appropriate number of quarter operating cycles.

In order to set the timing of the injection cycle correctly with respect to the operating cycle of one of the cylinders, the computer 20 is programmed according to the invention such that, upon engine start up, the engine is run with a timing stored in memory during an earlier running. This is because this timing, which was the correct timing for the previous running, has every chance of still being the correct timing for the running currently underway if the vehicle has not been moved with its engine switched off, that is to say in the vast majority of cases.

Figure 4:
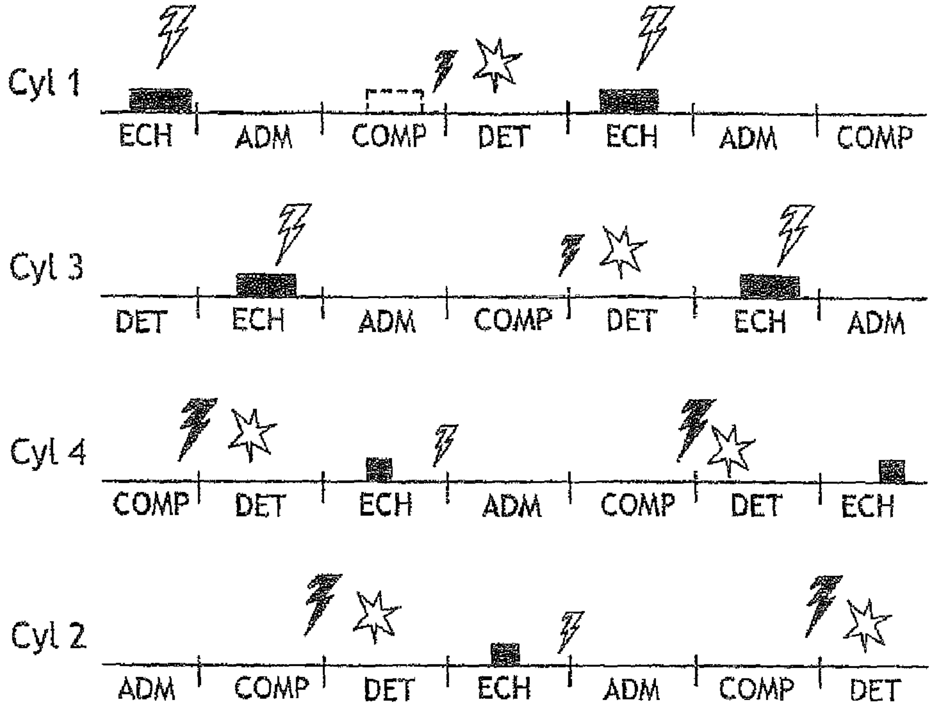
FIG. 4 is a diagram similar to the diagram of FIG. 3 showing the implementation of the method of the invention when the initial timing is the correct timing.
Figure 5:
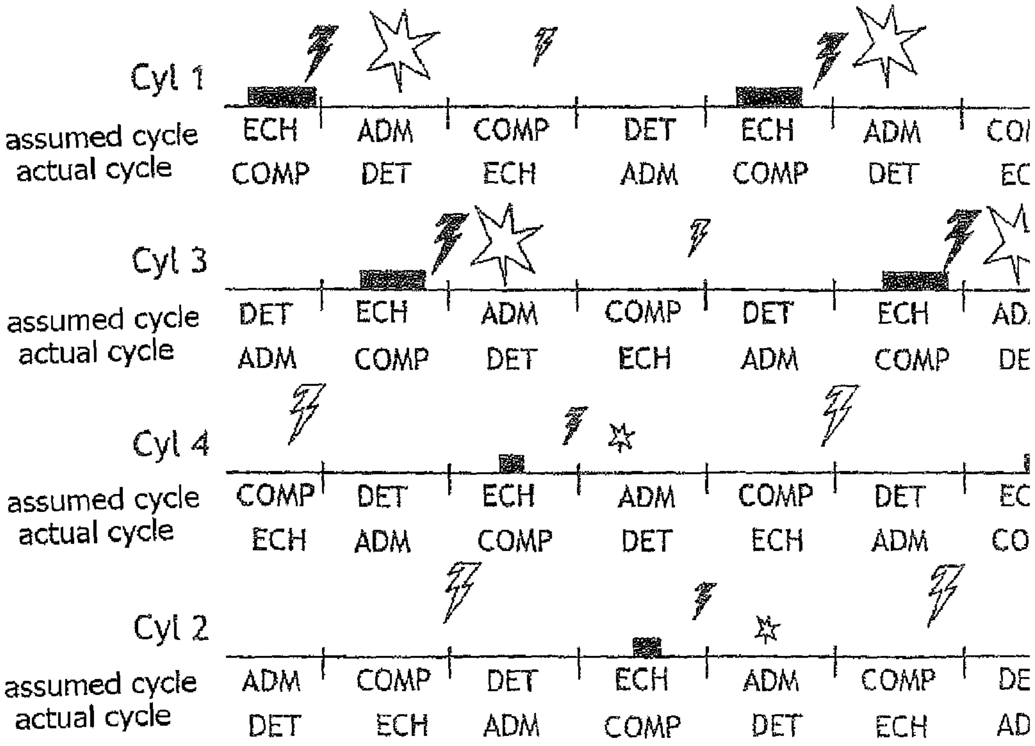
FIG. 5 is a diagram similar to the diagram of FIG. 3 showing the implementation of the method of the invention when the initial timing is the out-of-synchronism timing.

In order to check whether this timing actually is the correct timing for the current engine running, and as illustrated in FIGS. 4 and 5, the computer 20 is programmed to, as far as cylinders 1 and 3 are concerned, lengthen the injection period from a nominal injection period T to a lengthened injection period T' and, as far as cylinders 4 and 2 are concerned, shorten the injection period from the nominal injection period T to a shortened injection period T". In FIGS. 4 and 5, the variation in injection period is depicted symbolically by black rectangles of lengths longer or shorter than the length of the corresponding rectangles in FIG. 3.

At the same time, for cylinders 1 and 4 (in which the sparks are produced simultaneously), the computer 20 is programmed to lengthen the ignition advance in respect of the sparks produced during the stroke in cylinder 1 during which injection takes place. The ignition advance is thus lengthened from a nominal ignition advance a to a lengthened ignition advance a'. In parallel with this, the computer is designed, for these same cylinders, to shorten the ignition advance for the other sparks, and thus shorten the ignition advance from a nominal ignition advance a to a shortened ignition advance a".

In FIGS. 4 and 5, the sparks produced with a lengthened ignition advance a' are symbolically depicted by a flash of a larger size, and the sparks produced with a shortened ignition advance a" are symbolically depicted as a flash of a smaller size.

Likewise, for cylinders 2 and 3 (the sparks of which are produced simultaneously), the computer 20 is programmed to lengthen the ignition advance of the sparks produced during the stroke in cylinder 3 during which injection takes place and to shorten the ignition advance of the other sparks.

Thus, in each cylinder, the sparks are produced in succession with a lengthened ignition advance a' and a shortened ignition advance a".

FIG. 4 illustrates implementation of the method of the invention during running of the engine in which the timing of the injection cycle with respect to the operating cycle is correct.

Injection therefore takes place during the exhaust stroke ECH. The fuel enters the cylinders during the induction stroke ADM that immediately follows the exhaust stroke ECH.

It may be seen that, for cylinders 1 and 3, the useful sparks (in black) that is to say those which are produced during the compression strokes COMP, have a shortened ignition advance a".

For these same cylinders, the lengthened injection period T' contributes to enriching the mixture admitted and should therefore, all other things being equal, cause an increase in engine torque. However, the shortening of the ignition advance of the useful spark contributes, all other things being equal to causing a reduction in engine torque. The shortening of the ignition advance of the useful spark therefore compensates for the lengthening of the injection period so that the torque produced by cylinders 1 and 3 during the power stroke DET is identical to the torque produced by these same cylinders prior to the implementation of the method of the invention.

The torque is depicted symbolically in FIG. 4 by a star during the compression stroke COMP. For cylinders 1 and 3, the magnitude of the torque (represented by the size of the star) is identical to the magnitude of the torque generated by these same cylinders during normal running illustrated in FIG. 3.

As far as cylinders 4 and 2 are concerned, the useful sparks (in black) have a lengthened ignition advance a'. For these same cylinders, the shortened injection period T" contributes towards making the admitted mixture more lean and should therefore, all other things being equal, cause a reduction in engine torque. However, the lengthening of the ignition advance of the useful spark contributes, all other things being equal, to causing an increase in engine torque.

The lengthening of the ignition advance of the useful spark therefore compensates for the shortening of the injection period so that the torque produced by cylinders 4 and 2 during the power stroke DET is identical to the torque produced by these same cylinders prior to implementation of the method of the invention.

Thus, if the injection timing is correct, the changes to the injection period and to the ignition advance compensate for one another such that the torque is changed little if at all.

The effect of these same changes if the timing is out of synchronism can be seen in FIG. 5.

This figure is annotated with the assumed operating cycle and the actual operating cycle which is phase-shifted from the assumed operating cycle by half an operating cycle.

Injection therefore takes place not during the exhaust stroke ECH but during the compression stroke, which is phase-shifted from the exhaust stroke ECH by half an operating cycle. The fuel then enters the cylinder during the next induction stroke ADM, that is to say three strokes after the compression stroke COMP.

As far as cylinders 1 and 3 are concerned, the useful sparks (in black), that is to say those which are produced during the compression stroke COMP, have a lengthened ignition advance a'.

Thus, the lengthened injection period T' of cylinders 1 and 3 is no longer compensated for by a shortening of the ignition advance. By contrast, the effects of lengthening the injection period and of lengthening the ignition advance combine here to increase the torque produced during the power strokes DET by cylinders 1 and 3. In FIG. 5, the increase in torque is depicted symbolically by stars of a larger size.

As far as cylinders 4 and 2 are concerned, the useful sparks (in black) have a shortened ignition advance a".

Thus, the shortened injection period T" for cylinders 4 and 2 is no longer compensated for by a longer ignition advance. By contrast, the effects of the shortening of the injection period and the shortening of the ignition advance combine here to reduce the torque produced during the power strokes DET by cylinders 4 and 2. In FIG. 5, the reduction in torque is depicted symbolically by stars of a smaller size.

Thus, if the injection timing is out of synchronism, the changes to the injection period and to the ignition advance will no longer compensate for one another which means that the engine torque will change (two strokes of increased torque followed by two strokes of reduced torque) which are perfectly detectable.

Thus, all that is required is for the engine torque to be monitored for a certain length of time (typically a few tens of engine operating cycles). If the engine torque changes little or not at all then the timing is correct. If the engine torque undergoes detectable changes then the timing is out of synchronism. In this case, the computer 20 phase shifts the injection cycle by half an operating cycle or by one revolution of the crankshaft in order to cause injection to occur during the exhaust stroke ECH. The computer 20 then returns the injection period and the ignition advance to their nominal values and stores the current timing in memory. According to one particular aspect of the invention, and this is illustrated in FIGS. 6 and 7, the changes to the injection period and to the ignition advance are preferably made progressively so that the cumulative effects of these increases on engine torque occur gradually, thus contributing to minimizing the possibly disagreeable nature of the experiences that the passengers of the vehicle may have during changes in torque resulting from timing that is out of synchronism (although in practice, these are very rare).

Figure 6:
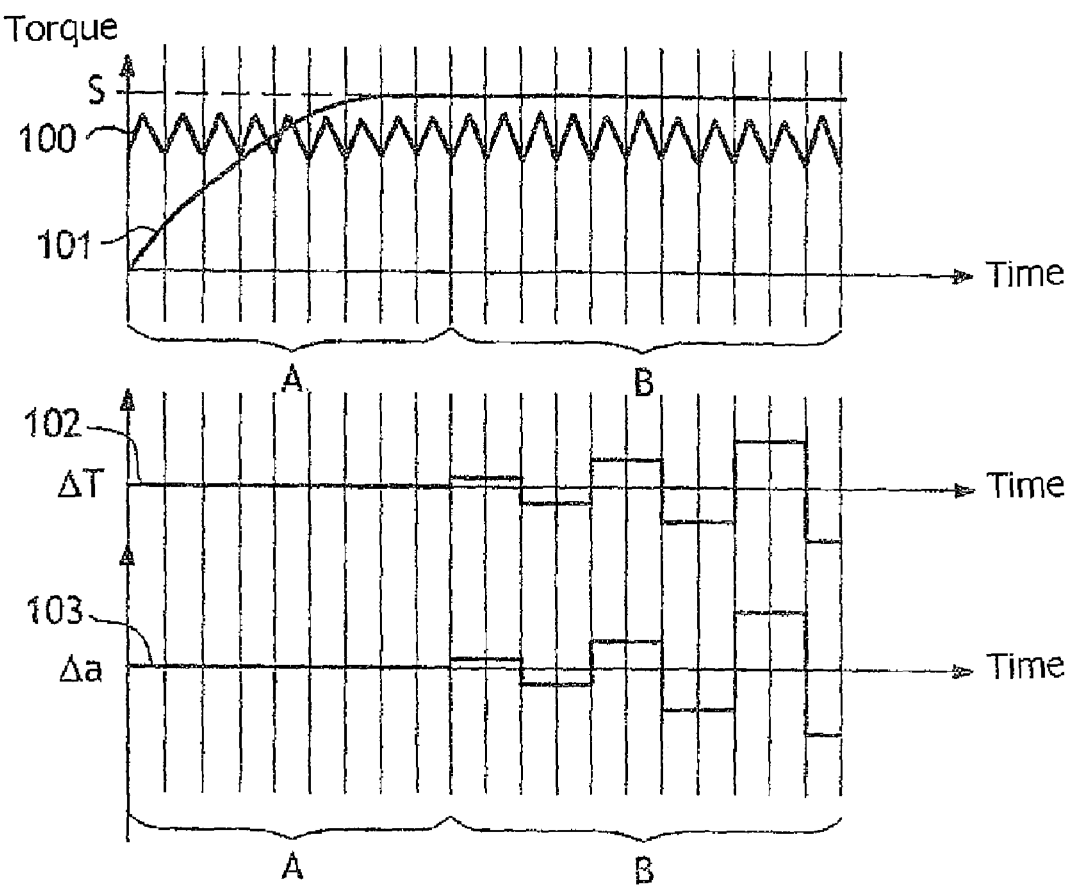
FIG. 6 is a graph bearing, plotted as a function of time, a curve of engine torque before and during implementation of the method of the invention, the initial timing being the correct timing, and curves of the deviations in the parameters changed from their nominal values during implementation of the method of the invention.
Figure 7:
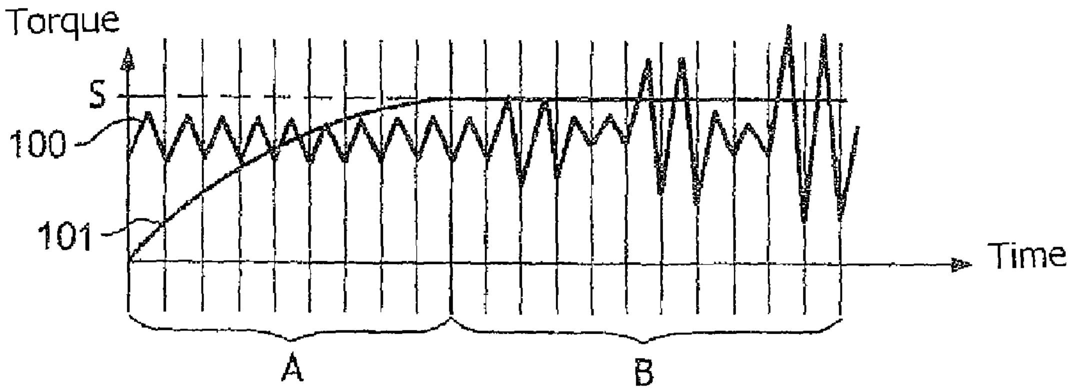
FIG. 7 is a graph bearing a torque curve similar to that of FIG. 6 when the initial timing is the out-of-synchronism timing.

FIG. 6 uses bold marks to illustrate the engine torque 100. During a learning phase A, the engine is run at a given operating point.

The torque curve depicted, obtained by continuous measurement using the torque sensor, exhibits fluctuations about a mean torque. The computer 20 is programmed to determine an engine torque threshold 101. Here, and in a way known per se, the threshold 101 is determined progressively, by learning, until a steady state value S is reached, this value being the one that will be adopted for implementing the method of the invention. For example, the threshold value S adopted will be the torque value which, on average, is exceeded only once every 10 or 20 engine operating cycles. In practice, in order to determine the threshold S, a mean torque is measured, and to this mean is added a deviation which depends on the operating speed and which is calibrated on a reference engine.

FIG. 6 also illustrates an injection curve 102 showing the deviations ΔT in the injection period with respect to a nominal injection period T corresponding to the operating point adopted, and an ignition advance curve 103 showing the deviations Δa in ignition advance with respect to a nominal ignition advance a that corresponds to the operating point adopted.

During the learning phase A, all the engine operating parameters, and therefore the injection period and the ignition advance, are kept at their nominal values, as illustrated by the horizontal line of curves 102 and 103.

Next, in a determining phase B, the method of the invention is implemented by changing the injection period 102, successively lengthening it for two strokes for injection into cylinders 1 and 3, and shortening it for the next two strokes for injection into cylinders 4 and 2. Next, for the next two strokes, the injection period is lengthened once again, this time by a greater amount, then the injection period is shortened for the next two strokes by the same amount. The injection period thus continues to be lengthened and then shortened, each time by a greater amount. These progressive changes to the amplitude of the deviations ΔT are illustrated by the part of the curve 102 during the determining phase B which exhibits square-wave pulses of ever increasing amplitude.

The same is done to the ignition advance. The ignition advance is lengthened for two strokes for all the cylinders, then the ignition advance is shorted for two strokes for all the cylinders. The part of the ignition advance curve 103 during the determining phase B exhibits a shape similar to that of the injection curve 102.

The amount by which the ignition advance is changed is advantageously chosen so that the effect of changing the ignition advance compensates for the effect of the accompanying change to the injection period, if the timing is correct.

On a torque curve 100 of FIG. 6, which relates to a correct timing, it can be seen that the deviations ΔT, Δa, which are increased progressively, have had no effect on the engine torque. The torque curve 100 thus, during the determining phase B, exhibits a profile similar to the torque curve 100 during the learning phase. The passengers of the vehicle will feel nothing.

In FIG. 7 which relates to timing that is out of synchronism, it can be seen, on the other hand, that the deviations in injection period ΔT and in ignition advance Δa do not compensate for one another and have a significant effect on the torque: the engine torque curve 100 exhibits, for two strokes, an increase then, for the next two strokes, a decrease. As the deviations increase in magnitude, so the engine torque 100 ultimately cleanly crosses the threshold S, whereas when the timing is correct, the torque never (or very rarely) crosses the threshold S.

By a establishing a threshold-crossing criterion, for example by counting the number of times that the engine torque crosses the threshold S during the time for which the method of the invention is being implemented, it is then very simple to determine whether the timing adopted for running the engine is the correct timing or the timing that is out of synchronism.

Advantageously, the method of the invention stops being implemented early enough on that any effects of the changes on the engine torque doe not have time to become inconvenient to the passengers.

According to another implementation of the method of the invention, the computer 20 is programmed to, upon engine start up, run the engine with a timing stored in memory during an earlier running and which, as already explained, has every chance of being the correct timing.

Then, as explained before, the computer is programmed to simultaneously change the injection period and the ignition advance from nominal operating conditions.

When the engine is being run with the changed parameters, the computer 20 calculates a mean of a quantity representative of the fluctuations in engine torque, for example the difference between a consecutive maximum and minimum torque value, over a determined period of time of the order of a few engine cycles.

Following a return to nominal engine operating conditions and according to an important aspect of this implementation, the timing of the injection cycle is deliberately reversed.

Once again, the computer 20 simultaneously changes the injection period and the ignition advance and calculates a mean of the same quantity over the same determined period of time.

All that is then required is for the two means thus obtained to be compared with one another. If the effects of the changes combine in the case of timing that is out of synchronism, then the mean corresponding to the out-of-synchronism timing is greater than the mean for correct timing.

All that is then required is for the timing that corresponds to the lower mean to be selected in order to determine the correct timing.

The advantage of this implementation lies in the absence of a learning stage in order to determine a threshold, thus saving time. It is also possible to avoid the use of a threshold calibrated on a reference engine, thus making this implementation less sensitive to spread across vehicles. However, this implementation entails the systematic running of the engine with the out-of-synchronism timing, and this may itself give rise to a number of vibrations that may be felt by the passengers. However, in practice, the inconvenience caused is very limited.

The invention is not restricted to that which has just been described but on the contrary encompasses any variant that falls within the scope defined by the claims.

In particular, although the engine operating parameters changed are the injection period and the ignition advance, other parameters could be changed, at the same time contriving for the changes to the parameter to have, on engine operation (on the torque as here, but also on other quantities such as the rotational speed, noise, etc.) effects that compensate for one another when the timing is correct and which do not compensate for one another when the timing is out of synchronism.

Although it has been mentioned that the engine is run with a timing corresponding to the timing of an earlier running, thus making it possible with near certainty to select the correct timing, it is possible to dispense with this step and, for example, to choose a timing at random. This then reduces the probability that the timing chosen initially will be the correct timing. However, in at least one situation out of two, the timing chosen is correct and gives rise to no feeling that the passengers can perceive, and this may prove acceptable from a passenger-comfort viewpoint.

Although it has been mentioned that the changes are made progressively to the parameters in order gradually to reveal the effects of the changes to the parameters on the running of the engine, this measure is not essential to the implementation of the method of the invention and the changes may be made by increments rather than progressively.

The operating point chosen for implementing the method of the invention is entirely arbitrary. However, as a preference, an operating point that corresponds to a stabilized low idle upon vehicle start-up will be chosen. In any event, the method of the invention can be implemented at any time while the vehicle is operating.

The invention claimed is:

1. A method for determining a timing of an injection cycle with respect to an operating cycle of each cylinder of a four-stroke (ADM, COMP, DET, ECH) engine, wherein the timing of the injection cycle is one of correct with respect to the operating cycle or out-of-synchronism with respect to the operating cycle, the method comprising:

running the engine while making a first change to a first operating parameter of the engine designed to cause, in the running of the engine, a first set of effects; and at the same time as the first change is made, making a second change to a second operating parameter of the engine, wherein the second change is designed to cause, in the running of the engine, a second set of effects which compensate for the first set of effects when the timing of the injection cycle is correct with respect to the operating cycle, and wherein the second set of effects do not compensate for the first set of effects when the timing of the injection cycle is out-of-synchronism with respect to the operating cycle, and wherein the first set of effects is different based on whether the timing of the injection cycle is correct or out-of-synchronism with respect to the operating cycle.

2. The method as claimed in claim 1, wherein, in order to implement the method, the engine is run with a previous timing of a previous running of the engine.

3. The method as claimed in claim 2, wherein, when the engine stops running, a current timing is stored in memory.

4. The method as claimed in claim 1, wherein the changes to the first and second operating parameters are made progressively.

5. The method as claimed in claim 4, wherein the changes to the first and second operating parameters comprise an operation of progressively increasing a deviation, for each operating parameter, from a nominal value of each operating parameter.

6. The method as claimed in claim 1, wherein the first engine operating parameter is an injection period and the second engine operating parameter is an ignition advance.

7. The method as claimed in claim 6, wherein, for a portion of the cylinders of the engine, the injection period is lengthened and the ignition advance is shortened and, for a remaining balance of the cylinders, the injection period is shortened and the ignition advance is lengthened.

8. The method as claimed in claim 1, wherein an engine operating variable liable to be influenced by the first and second operating parameters is monitored to detect any effect of the changes to the first and second operating parameters on the engine operating variable.

9. The method as claimed in claim 8, further comprising:

establishing a threshold with respect to the monitored operating variable, during an earlier learning phase, wherein the threshold is one that is not normally crossed by the operating variable when the engine is running at a given operating point.

10. The method as claimed in claim 9, wherein, in order to distinguish correct timing of the injection cycle from timing that is out-of-synchronism, one or more potential crossings of the threshold by the operating variable as a result of the change to the first and second operating parameters, is detected.

11. The method as claimed in claim 1, whereby:

the engine is run with a first timing of the injection cycle, the simultaneous changes are made to the first and second operating parameters and, for a given period of time, an average quantity representative of fluctuations in an engine operating variable is calculated;

the engine is run with a second timing of the injection cycle different from the first timing, simultaneous changes are made to the first and second operating parameters and, over a determined period of time, an average quantity representative of fluctuations in the engine operating variable is calculated; and the average quantities calculated are compared to determine the correct timing of the injection cycle with respect to the operating cycle.

12. The method as claimed in claim 8, wherein the operating variable monitored is engine torque.

13. A device for determining the timing of an injection cycle with respect to an operating cycle of a four-stroke engine, comprising:

means for, while the engine is running, making a first change to a first engine operating parameter designed to bring about, in the running of the engine, a first set of effects; and means for simultaneously making a second change to a second engine operating parameter designed to cause, in the running of the engine, a second set of effects, wherein the second set of effects compensate for the first set of effects when the timing of the injection cycle is correct with respect to the operating cycle, and wherein the second set of effects do not compensate for the first set of effects when the timing of the injection cycle is out-of-synchronism with respect to the operating cycle.

* * * * *